(12) United States Patent
Imafuku (10) Patent No.: US 10,234,009 B2
(45) Date of Patent: Mar. 19, 2019

(54) DIFFERENTIAL LIMITING DEVICE FOR VEHICLE

(71) Applicant: TOYOTA JIDOSHA KABUSHIKI KAISHA, Toyota-Shi, Aichi-Ken (JP)

(72) Inventor: Mizuki Imafuku, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 46 days.

(21) Appl. No.: 15/714,417

(22) Filed: Sep. 25, 2017

(65) Prior Publication Data

US 2018/0100569 A1   Apr. 12, 2018

(30) Foreign Application Priority Data

Oct. 6, 2016   (JP) .................................. 2016-198545

(51) Int. Cl.

| | |
|---|---|
| *F16H 48/22* | (2006.01) |
| *B60K 17/02* | (2006.01) |
| *B60K 17/344* | (2006.01) |
| *F16D 13/52* | (2006.01) |
| *F16D 23/00* | (2006.01) |
| *F16H 25/22* | (2006.01) |
| *F16H 48/08* | (2006.01) |
| *F16H 48/34* | (2012.01) |
| *F16D 23/12* | (2006.01) |
| *F16H 48/24* | (2006.01) |

(Continued)

(52) U.S. Cl.
CPC .............. *F16H 48/22* (2013.01); *B60K 17/02* (2013.01); *B60K 17/344* (2013.01); *F16D 13/52* (2013.01); *F16D 23/00* (2013.01); *F16D 23/12* (2013.01); *F16H 25/2204* (2013.01); *F16H 48/08* (2013.01); *F16H 48/24* (2013.01); *F16H 48/34* (2013.01); F16D 2023/123 (2013.01); F16D 2125/52 (2013.01); F16H 1/16 (2013.01); F16H 2025/209 (2013.01); F16H 2048/343 (2013.01)

(58) Field of Classification Search
CPC ...... F16H 48/22; F16H 13/52; F16H 25/2204; F16H 48/08; F16H 48/34; F16H 1/163; F16H 48/24; F16D 2023/123; F16D 23/12; B60K 17/02; B60K 17/344
See application file for complete search history.

(56) References Cited

U.S. PATENT DOCUMENTS

| 8,479,892 B2 * | 7/2013 | Elliot ..................... B64O 25/44 188/72.8 |
| 2002/0032096 A1 | 3/2002 | Gassmann |

(Continued)

FOREIGN PATENT DOCUMENTS

GB       2354563 A       3/2001

*Primary Examiner* — Stacey A Fluhart
(74) *Attorney, Agent, or Firm* — Oliff PLC (57) ABSTRACT

In a differential limiting device for a vehicle, when rotary motion of an electric motor is converted by a screw mechanism into linear motion of a nut member in a direction of a first axis C1 of a side gear shaft, and a piston mounted on the nut member is moved in a direction opposite to a direction to depress frictional engagement elements, the piston and a clutch drum are relatively non-rotatably engaged. Therefore, differential rotation of a pair of side gears is mechanically limited. Thus, rotation of one electric motor makes it possible to generate differential limiting torque for limiting differential rotation of the pair of side gears in a rear-wheel differential device.

6 Claims, 8 Drawing Sheets

(51) Int. Cl.
    *F16H 1/16*     (2006.01)
    *F16H 25/20*     (2006.01)
    *F16D 125/52*     (2012.01)

(56) References Cited

U.S. PATENT DOCUMENTS

| | | | | |
|---|---|---|---|---|
| 2004/0020325 | A1* | 2/2004 | Krzesicki | F16H 48/19 74/650 |
| 2004/0050643 | A1* | 3/2004 | Krzesicki | F16D 25/083 192/70.23 |
| 2010/0181137 | A1* | 7/2010 | Ishida | F16D 13/52 180/293 |
| 2016/0096429 | A1* | 4/2016 | Imafuku | B60K 17/344 180/233 |
| 2016/0097430 | A1* | 4/2016 | Imafuku | F16D 11/04 192/18 B |
| 2016/0101690 | A1* | 4/2016 | Imafuku | B60K 17/346 701/51 |

* cited by examiner

DIFFERENTIAL LIMITING DEVICE FOR VEHICLE

INCORPORATION BY REFERENCE

The disclosure of Japanese Patent Application No. 2016-198545 filed on Oct. 6, 2016 including the specification, drawings and abstract is incorporated herein by reference in its entirety.

BACKGROUND

1. Technical Field

The disclosure relates to a differential limiting device for a vehicle, which limits differential rotation of a pair of side gears provided in a differential device, and is particularly concerned with a technology for favorably reducing the size of the differential limiting device for the vehicle.

2. Description of Related Art

For example, a differential limiting device for a vehicle, which limits differential rotation of a pair of side gears provided in a differential device, is known. One example of the differential limiting device for the vehicle is described in U.S. Patent Application Publication No. 2002/0032096. The differential limiting device for the vehicle described in this publication includes a friction clutch having a plurality of frictional engagement elements and a piston, a motor, and a ball cam mechanism that converts rotary torque of the motor into thrust force of the piston. In operation, the rotary torque of the motor is converted by the ball cam mechanism into the thrust force of the piston, so that the frictional engagement elements are depressed by the piston. Thus, differential limitation torque for limiting differential rotation of the pair of side gears is generated.

SUMMARY

In the meantime, the differential limiting device for the vehicle as described above has a problem that, during relatively hard, off-road traveling, the frictional engagement elements may slip due to a shortage of the torque capacity of the friction clutch, and burning may occur in the friction clutch. In view of this problem, as a method for ensuring required torque capacity during relatively hard, off-road traveling, without increasing the torque capacity of the friction clutch, it may be considered to provide a dog clutch, or the like, for mechanically limiting differential rotation of a pair of side gears, so as to lock the differential device. However, to this end, there is a need to add a mechanism, such as an actuator, for engaging and disengaging the dog clutch, to the differential limiting device, which may result in increase of the size of the differential limiting device.

This disclosure makes it possible to mechanically limit differential rotation of a pair of side gears, while favorably reducing the size of a differential limiting device for a vehicle.

One aspect of the disclosure is concerned with a differential limiting device for a vehicle. The differential limiting device is used to limit differential rotation of a pair of side gears provided in a differential device. The differential limiting device includes a clutch hub, a clutch drum, a friction clutch, an actuator, and a screw mechanism. The clutch hub is coupled to one of a differential case of the differential limiting device and a side gear shaft. The clutch drum is coupled to the other of the differential case and the side gear shaft. The friction clutch includes a plurality of frictional engagement elements and a piston. The screw mechanism includes a screw shaft member and a nut member which are screwed together. The side gear shaft is coupled to the side gear. The plurality of frictional engagement elements include first frictional engagement elements and second frictional engagement elements. The first frictional engagement elements are configured to be relatively non-rotatably engaged with the clutch drum. The second frictional engagement elements are configured to be relatively non-rotatably engaged with the clutch hub. The first frictional engagement elements and the second frictional engagement elements are configured to overlap with each other so as to be in friction contact with each other. The screw mechanism is configured to convert rotary motion of the actuator into linear motion of the nut member in an axial direction of the side gear shaft, when a screw member is rotated about an axis of the side gear shaft by the actuator. The screw member is one of the screw shaft member and the nut member. The piston is configured to depress the plurality of frictional engagement elements. The piston is configured to rotate relative to the nut member about the axis of the side gear shaft. The piston is configured to be unable to move relative to the nut member in the axial direction of the side gear shaft. The piston is configured to be unable to rotate relative to a first clutch component about the axis of the side gear shaft. The piston is configured to move relative to the first clutch component in the axial direction. The piston is configured to be relatively non-rotatably engaged with a second clutch component, when the piston is moved in a direction opposite to a direction in which the piston depresses the frictional engagement elements. The first clutch component is one of the clutch hub and the clutch drum, and the second clutch component is the other of the clutch hub and the clutch drum.

With the above arrangement, rotary motion of the actuator is converted by the screw mechanism into linear motion of the nut member in the axial direction of the side gear shaft, so that the piston mounted on the nut member is moved in the direction opposite to the direction to depress the frictional engagement elements. As a result, the piston and the other of the clutch hub and the clutch drum are engaged such that they cannot rotate relative to each other. Therefore, differential rotation of the above pair of side gears is mechanically limited. Thus, rotation of one actuator makes it possible to generate differential limiting torque for limiting differential rotation of the pair of side gears in the differential device, or mechanically limit differential rotation of the pair of side gears. Accordingly, the number of components that constitute the differential limiting device for the vehicle can be favorably reduced, and the differential limiting device can be favorably reduced in size, as compared with a differential limiting device for a vehicle to which a mechanism for engaging and disengaging a dog clutch, namely, an actuator for engaging and disengaging the dog clutch, is added, only for the purpose of mechanically limiting differential rotation of the pair of side gears, for example.

In the differential limiting device as described above, the piston may be spline-fitted to the first clutch component such that the piston cannot rotate relative to the first clutch component, and may be configured to move relative to the first clutch component in the axial direction of the side gear shaft. The piston may include first meshing teeth. The second clutch component may include second meshing teeth. The first meshing teeth may mesh with the second meshing teeth, when the piston is moved by the nut member in the direction opposite to the direction in which the piston depresses the frictional engagement elements.

With the above arrangement, when the piston is moved in the direction opposite to the direction in which the piston depresses the frictional engagement elements, the meshing teeth formed on the piston are brought into meshing engagement with the meshing teeth formed on the other of the clutch hub and the clutch drum. Therefore, the piston and the other of the clutch hub and the clutch drum are engaged so as to be unable to rotate relative to each other.

In the differential limiting device as described above, the screw member may the nut member, the nut member may be supported by the side gear shaft such that the nut member rotates about the axis of the side gear shaft, and the screw shaft member may be supported by the side gear shaft such that the screw shaft member cannot move in the axial direction of the side gear shaft, and cannot rotate about the axis of the side gear shaft.

With the above arrangement, in the case where the screw member is the nut member, when the nut member is rotated/driven by the actuator, the nut member moves in the axial direction of the side gear shaft, and linear motion of the nut member in the axial direction of the side gear shaft is transmitted to the friction clutch.

In the differential limiting device as described above, the screw member may the screw shaft member, the nut member may be supported by the side gear shaft such that the nut member cannot rotate about the axis of the side gear shaft, and the screw shaft member may be supported by the side gear shaft such that the screw shaft member cannot move in the axial direction of the side gear shaft and rotate about the axis of the side gear shaft.

With the above arrangement, in the case where the screw member is the screw shaft member, when the screw member is rotated/driven by the actuator, the nut member moves in the axial direction of the side gear shaft, and linear motion of the nut member is transmitted to the friction clutch.

In the differential limiting device as described above, the actuator may be coupled to the screw mechanism via a worm gear.

With the above arrangement, since the actuator is coupled to the screw mechanism via the worm gear, it is possible to replace the actuator with a relatively low-output, small-sized actuator, while keeping torque of the screw member about the axis of the side gear shaft, which is provided by the actuator.

In the differential limiting device as described above, the nut member and the screw shaft member may be screwed together via a plurality of balls.

With the above arrangement, since the nut member and the screw shaft member are screwed together via the balls, the nut member and the screw shaft member smoothly rotate relative to each other. Therefore, electric power required by the actuator when the piston moves in the direction in which it depresses the frictional engagement elements, or the direction opposite to the direction to depress the frictional engagement elements, is stably reduced

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Some embodiments of the disclosure will be described in detail with reference to the drawings. In the following embodiments, parts or components illustrated in the drawings are simplified or modified as needed, and the ratio of dimensions, shape, etc. of each part or component are not necessarily accurately depicted.

Figure 1:
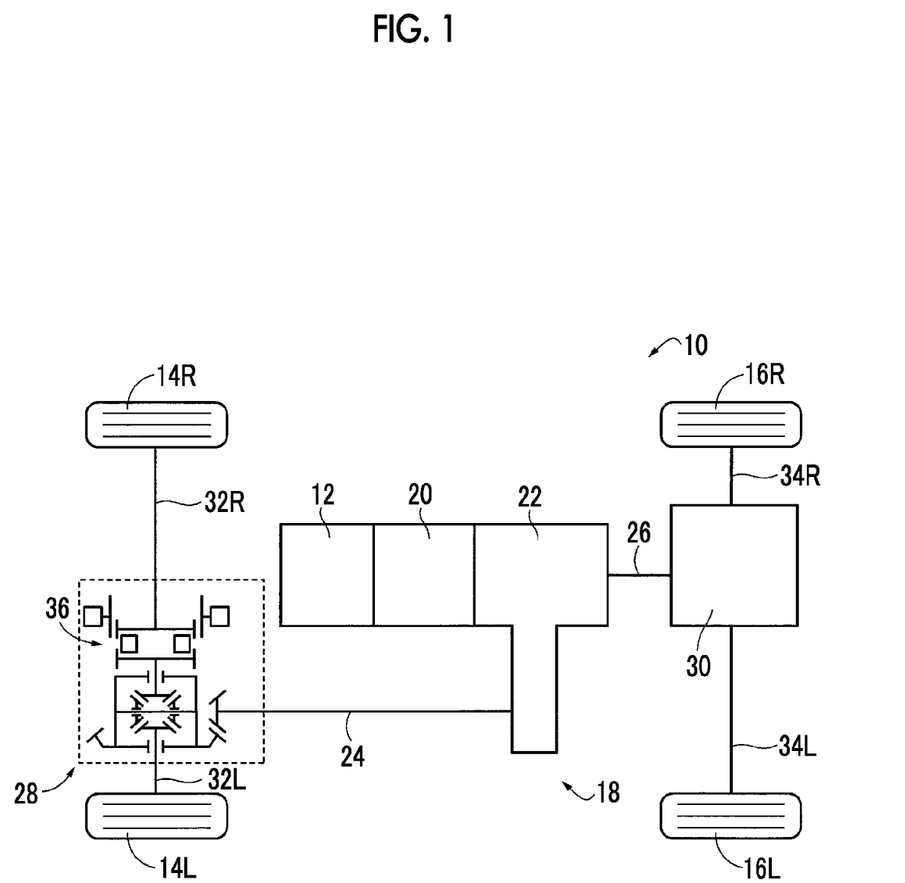
FIG. 1 is view illustrating the general configuration of a vehicle to which the disclosure is applied.

FIG. 1 shows the general configuration of a vehicle 10 to which the disclosure is applied. The vehicle 10 includes an engine 12 as a drive power source, left and right front wheels 14L, 14R (which will be referred to as "front wheels 14" when they are not particularly distinguished), left and right rear wheels 16R, 16L (which will be referred to as "rear wheels 16" when they are not particularly distinguished), a power transmission system 18 that transmits power of the engine 12 to the front wheels 14 and the rear wheels 16, respectively, and so forth. The rear wheels 16 are primary drive wheels that serve as drive wheels during traveling in a two-wheel drive (2WD) mode and during traveling in a four-wheel drive (4WD) mode. The front wheels 14 are secondary drive wheels that serve as driven wheels during traveling in the two-wheel drive (2WD) mode, and serve as drive wheels during traveling in the four-wheel drive (4WD) mode. The vehicle 10 is a four-wheel drive vehicle based on a front-engine rear-drive (FR) vehicle.

As shown in FIG. 1, the power transmission system 18 includes a transmission 20 coupled to the engine 12, a transfer case 22 for the four-wheel drive vehicle, which is a front- and rear-wheel power split device coupled to the transmission 20, front propeller shaft 24 and rear propeller shaft 26 respectively coupled to the transfer case 22, a front-wheel differential device 28 coupled to the front propeller shaft 24, a rear-wheel differential device 30 coupled to the rear propeller shaft 26, left and right front-wheel axles 32L, 32R (which will be referred to as "front-wheel axles 32" when they are not particularly distinguished) coupled to the front-wheel differential device 28, left and right rear-wheel axles 34L, 34R (which will be referred to as "rear-wheel axles 34" when they are not particularly distinguished) coupled to the rear-wheel differential device 30, and so forth. In the power transmission system 18 thus constructed, power of the engine 12 transmitted to the transfer case 22 via the transmission 20 is transmitted from the transfer case 22 to the rear wheels 16, via a power transmission path on the rear wheels 16 side, i.e., sequentially through the rear propeller shaft 26, rear-wheel differential device 30, and the rear-wheel axles 34. Also, a part of the power of the engine 12 transmitted to the rear wheels 16 side is imparted to the front wheels 14 side via the transfer case 22, and transmitted to the front wheels 14 via a power transmission path on the front wheels 14 side, i.e., sequentially through the front propeller shaft 24, front-wheel differential device 28, and the front-wheel axles 32.

As shown in FIG. 1, the front-wheel differential device 28 includes a front-side clutch 36 on the front-wheel axle 32R side (namely, between the front-wheel differential device 28 and the front wheel 14R). The front-side clutch 36 is a dog clutch that is electrically (or electromagnetically) controlled so as to selectively connect and disconnect a power transmission path between the front-wheel differential device 28 and the front wheel 14R. The front-side clutch 36 may be further provided with a synchronization mechanism (synchro mechanism). Although not illustrated in the drawings, the transfer case 22 is provided with a clutch for disconnection, which selectively transmits and inhibits a part of the power of the engine 12 transmitted to the rear wheels 16 side, to the front wheels 14 side, or to the front propeller shaft 24.

In the vehicle 10 constructed as described above, if the four-wheel drive mode is selected by an electronic control unit (not shown), for example, the front-side clutch 36 and the clutch provided in the transfer case 22 are engaged. As a result, a four-wheel drive state is established in which drive force is transmitted from the engine 12 to the left and right rear wheels 16L, 16R and the left and right front wheels 14L, 14R. If the two-wheel drive mode is selected by the electronic control unit, for example, the front-side clutch 36 and the clutch provided in the transfer case 22 are released. As a result, a two-wheel drive state is established in which drive force is transmitted from the engine 12 to the left and right rear wheels 16L, 16R. In the two-wheel drive state, the front-side clutch 36 and the clutch provided in the transfer case 22 are released. Therefore, the front propeller shaft 24 for transmitting drive force exclusively to the left and right front wheels 14R, 14L in the four-wheel drive state is disconnected from the engine 12 and the left and right front wheels 14L, 14R. Namely, the vehicle 10 is a four-wheel drive vehicle with a function of disconnecting a power transmitting member (front propeller shaft 24) for transmitting drive force exclusively to the left and right front wheels 14L, 14R as secondary drive wheels in the four-wheel drive state, from the engine 12 and the secondary drive wheels, in the two-wheel drive state.

Figure 2:
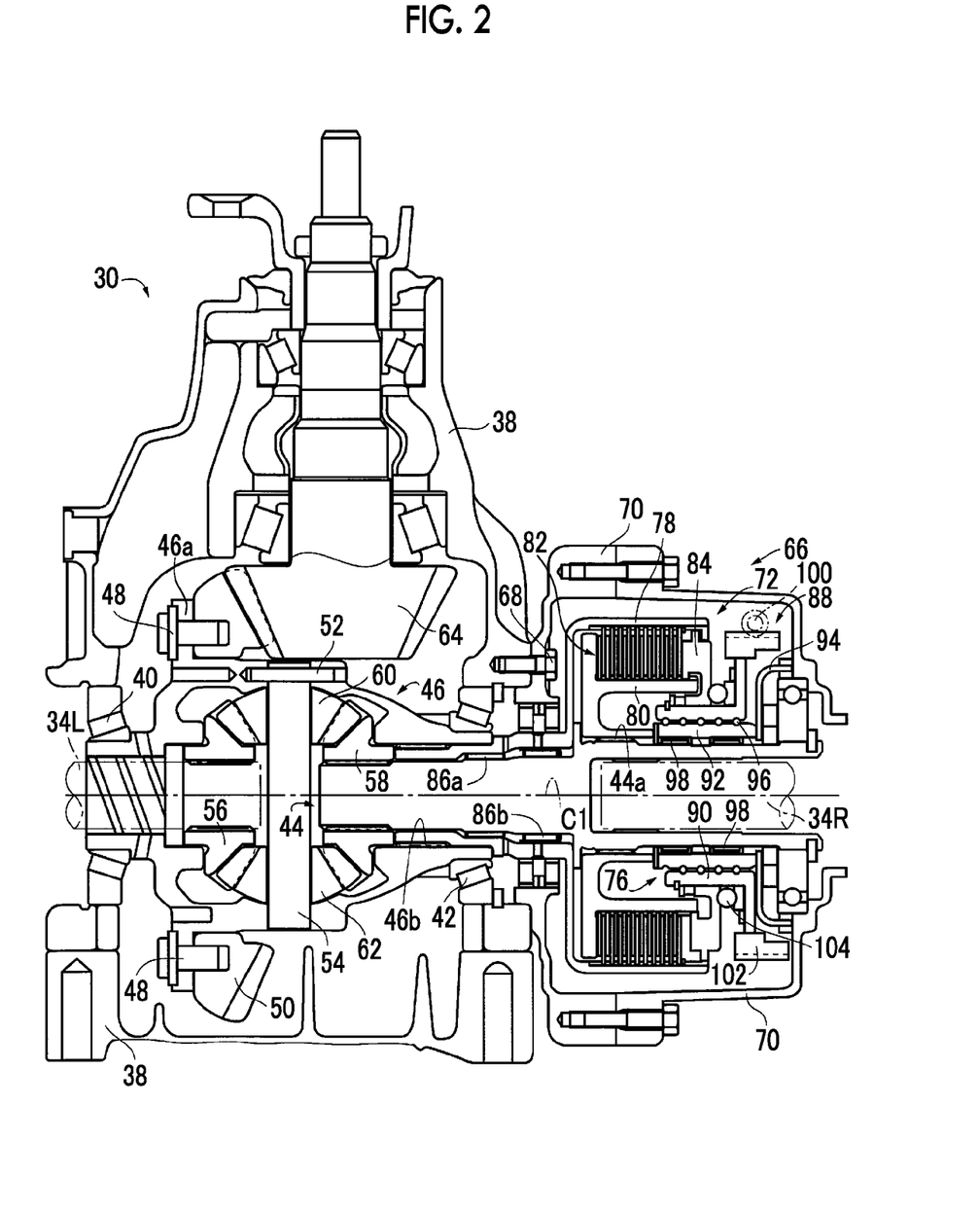
FIG. 2 is a cross-sectional view illustrating the general configuration of a rear-wheel differential device.
Figure 3:
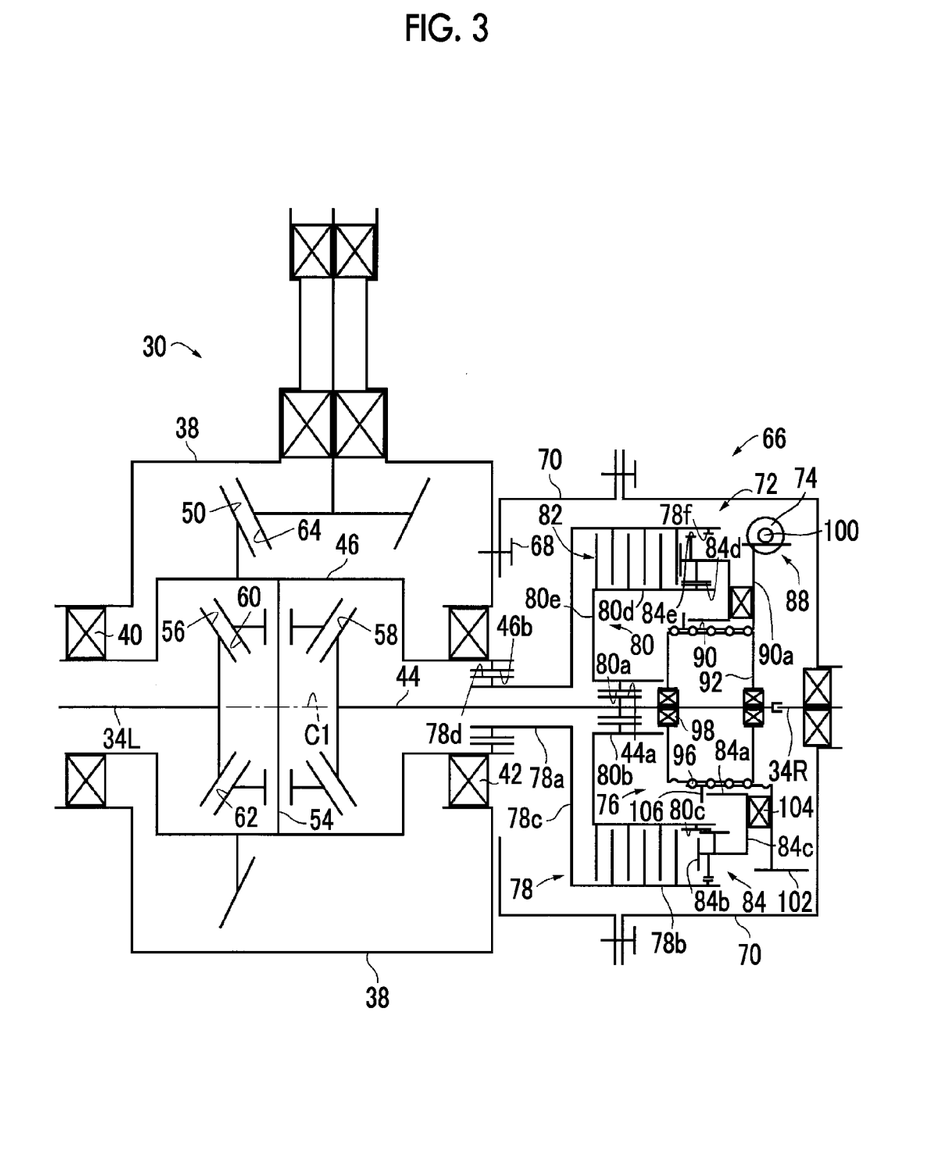
FIG. 3 is a skeleton diagram illustrating the general configuration of the rear-wheel differential device.

FIG. 2 and FIG. 3 show the configuration of the rear-wheel differential device 30 shown in FIG. 1. FIG. 2 is a cross-sectional view showing the configuration of the rear-wheel differential device 30, and FIG. 3 is a skeleton diagram showing the configuration of the rear-wheel differential device 30.

As shown in FIG. 2 and FIG. 3, the rear-wheel differential device 30 includes a housing 38 in which the rear-wheel differential device 30 is housed, a differential case 46 supported in the housing 38 via a first bearing 40 and a second bearing 42 such that it is rotatable about a first axis (shaft center) C1 of a side gear shaft 44 that will be described later, a ring gear 50 fixed to a radially outer portion 46a (see FIG. 2) of the differential case 46 with fastening bolts 48, a columnar pinion shaft 54 that has opposite end portions supported by the differential case 46, and is fixed to the differential case 46 with knock-pins 52 so as to extend in a direction perpendicular to the first axis C1 of the side gear shaft 44, a pair of side gears 56, 58 supported by the differential case 46 such that they are rotatable about the first axis C1, in a condition where the side gears 56, 58 are opposed to each other with the pinion shaft 54 interposed therebetween, and a pair of pinion gears 60, 62 that are rotatably supported by the pinion shaft 54 that extends through the pinion gears 60, 62, and mesh with the side gears 56, 58, between the pair of side gears 56, 58. The ring gear 50 is in meshing engagement with a drive gear 64 coupled to an end portion of the rear propeller shaft 26 on the rear wheels 16 side. The side gear shaft 44 is coupled to the side gear 58 such that they cannot rotate relative to each other, and the rear-wheel axle 34R is coupled to the side gear shaft 44 such that they cannot rotate relative to each other. Also, the rear-wheel axle 34L is coupled to the side gear 56 such that they cannot rotate relative to each other. In the rear-wheel differential device 30 constructed as described above, power transmitted from the engine 12 via the rear propeller shaft 26 is transmitted to the rear wheels 16L, 16R, while differential rotation of the left and right rear-wheel axles 34L, 34R is permitted.

Figure 4:
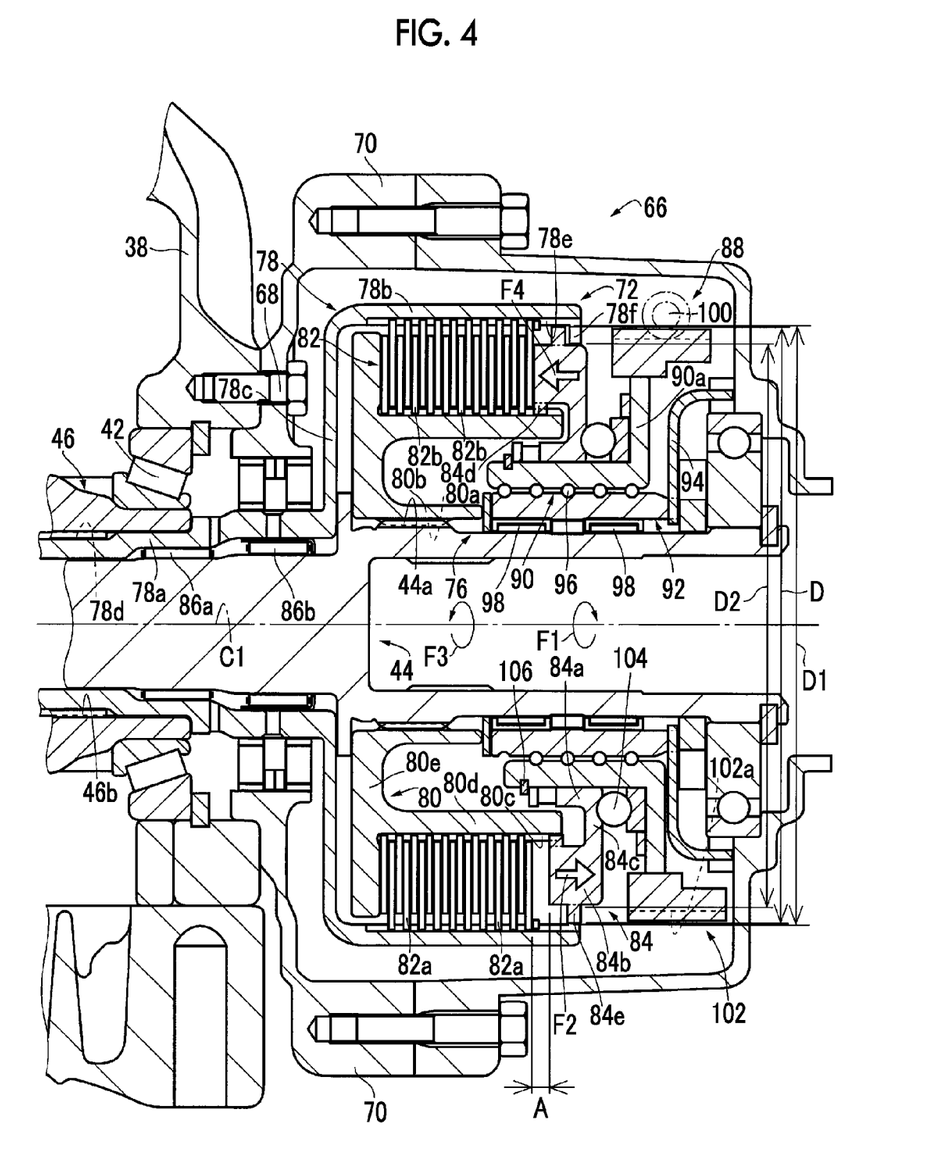
FIG. 4 is a cross-sectional view illustrating the general configuration of a differential limiting device provided in the rear-wheel differential device of FIG. 2.

As shown in FIG. 2 and FIG. 3, the rear-wheel differential device 30 is provided with a differential limiting device (differential limiting device for a vehicle) 66 that limits differential rotation of the pair of side gears 56, 58. As shown in FIG. 4, the differential limiting device 66 includes a case member 70 that houses the differential limiting device 66, and is integrally fixed to the housing 38 with fastening bolts 68, a friction clutch 72 that connects or disconnects a power transmission path between the differential case 46 and the side gear shaft 44, an electric motor (actuator) 74 (see FIG. 3), and a screw mechanism 76 that converts rotary motion of the electric motor 74 into linear motion, and transmits the linear motion to the friction clutch 72.

As shown in FIG. 4, the friction clutch 72 has a clutch drum 78, a clutch hub 80, a plurality of frictional engagement elements 82, and a piston 84. The clutch drum 78 is supported in the case member 70 such that it is rotatable about the first axis C1 of the side gear shaft 44, and is coupled to the differential case 46 such that power can be transmitted therebetween. The clutch hub 80 is coupled to the side gear shaft 44 such that power can be transmitted therebetween. The frictional engagement elements 82 are alternately engaged with the clutch drum 78 and the clutch hub 80 such that the elements 82 cannot rotate relative to the corresponding clutch drum 78 or clutch hub 80. Also, the frictional engagement elements 82 overlap with each other such that they can frictionally contact with each other. The piston 84 is operable to depress the frictional engagement elements 82.

As shown in FIG. 4, the clutch drum 78 includes, integrally, a first cylindrical portion 78a, a second cylindrical portion 78b, and a connecting portion 78c that connects the first cylindrical portion 78a with the second cylindrical portion 78b. The first cylindrical portion 78a is supported by the side gear shaft 44 via needle bearings 86a, 86b, such that it is rotatable relative to the side gear shaft 44. The second cylindrical portion 78b is disposed on the radially outer side of the clutch hub 80, and is formed at its inner circumferential portion with inner circumferential spline teeth 78e. The first cylindrical portion 78a of the clutch drum 78 is formed with outer circumferential spline teeth 78d that are spline-fitted to inner circumferential spline teeth 46b formed on the differential case 46, and the clutch drum 78 and the differential case 46 are coupled to each other so as to be unable to rotate relative to each other.

As shown in FIG. 4, the clutch hub 80 includes, integrally, a first cylindrical portion 80b formed with inner circumferential spline teeth 80a, a second cylindrical portion 80d formed at its outer periphery with outer circumferential spline teeth 80c, and a connecting portion 80e that connects the first cylindrical portion 80b with the second cylindrical portion 80d. The clutch hub 80 and the side gear shaft 44 are coupled to each other so as to be unable to rotate relative to each other. The inner circumferential spline teeth 80a are spline-fitted to outer circumferential spline teeth 44a formed on the side gear shaft 44. The second cylindrical portion 80d is disposed on the radially inner side of the second cylindrical portion 78b of the clutch drum 78.

Figure 5:
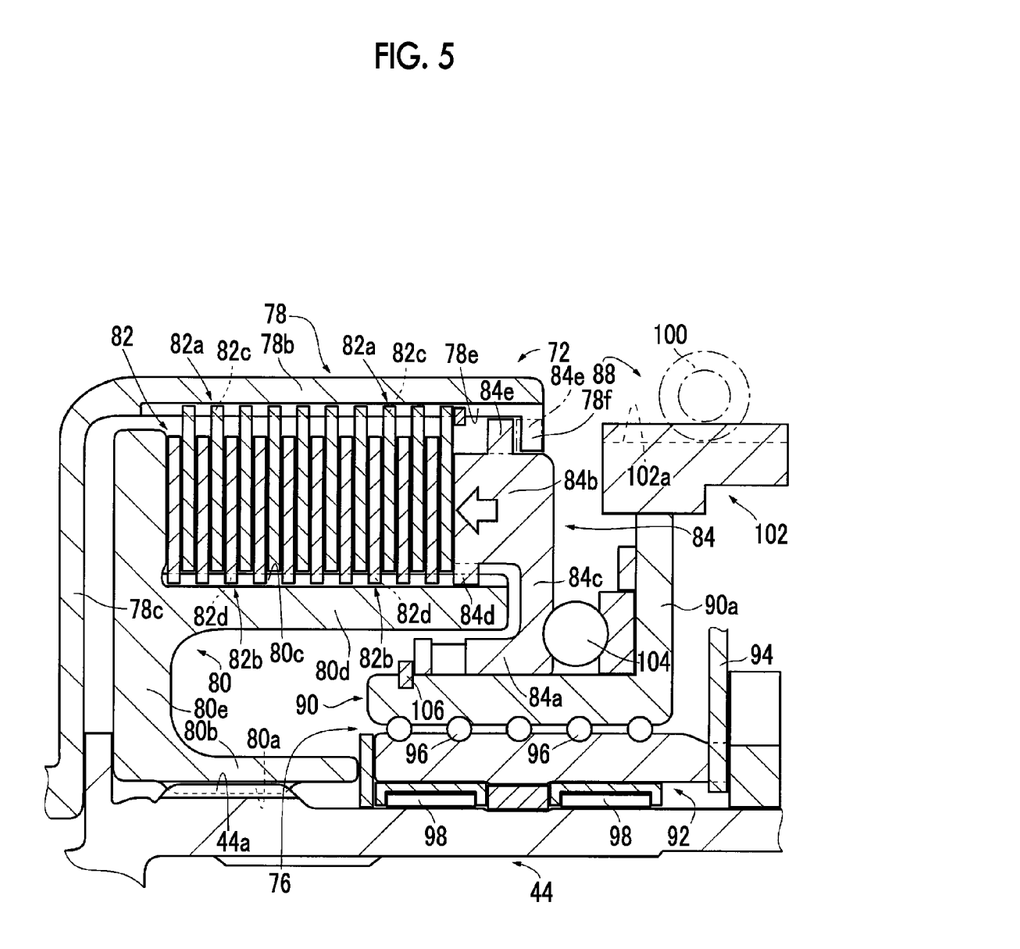
FIG. 5 is an enlarged view of a part of the differential limiting device of FIG. 4.

As shown in FIG. 4, the frictional engagement elements 82 include a plurality of annular first friction plates 82a that are engaged with the clutch drum 78 such that they can move relative to the clutch drum 78 in the direction of the first axis C1, and cannot rotate relative to the clutch drum 78 about the first axis C1, and a plurality of annular second friction plates 82b that are engaged with the clutch hub 80 such that they can move relative to the clutch hub 80 in the direction of the first axis C1, and cannot rotate relative to the clutch hub 80 about the first axis C1. As shown in FIG. 5, each of the annular first friction plates 82a is formed at its outer periphery with outer circumferential teeth 82c that mesh with inner circumferential spline teeth 78e formed on the second cylindrical portion 78b of the clutch drum 78. Each of the annular second friction plates 82b is formed at its inner periphery with inner circumferential teeth 82d that mesh with outer circumferential spline teeth 80c formed on the second cylindrical portion 80d of the clutch hub 80.

As shown in FIG. 4, the screw mechanism 76 includes a nut member (one of the screw members) 90 as a rotating member that is indirectly coupled to the electric motor 74 via a worm gear 88 such that power can be transmitted therebetween, a screw shaft member (the other screw member) 92 screwed in the nut member 90, and a connecting member 94 that connects an end portion of the screw shaft member 92 on the rear wheel 16 side, with the case member 70 as a non-rotating member. The connecting member 94 connects the end portion on the rear wheel 16R side with the case member 70, so as to mount the screw shaft member 92 on the side gear shaft 44 such that the member 92 cannot move in the direction of the first axis C1 of the side gear shaft 44, and cannot rotate about the first axis C1. The nut member 90 is screwed on the screw shaft member 92 via a plurality of balls 96, and the screw mechanism 76 is a ball screw in which the nut member 90 and the screw shaft member 92 operate via the plurality of balls 96. The screw shaft member 92 is supported by the side gear shaft 44 via needle bearings 98, so as to be rotatable relative to the side gear shaft 44. In the screw mechanism 76 thus constructed, the nut member 90, as one of the screw members (i.e., the screw shaft member 92 and the nut member 90) that are screwed together, is rotated/driven by the electric motor 74, about the first axis C1 of the side gear shaft 44. As a result, rotary motion of the electric motor 74 is converted into linear motion of the nut member 90 in the direction of the first axis C1 of the side gear shaft 44. In the screw mechanism 76, the nut member 90 is screwed on the screw shaft member 92, so that the nut member 90 is supported by the side gear shaft 44 so as to be rotatable about the first axis C1 of the side gear shaft 44. Also, with the connecting member 94 and the first cylindrical portion 80b of the clutch hub 80, the screw shaft member 92 is supported on the side gear shaft 44 such that it cannot move in the direction of the first axis C1 of the side gear shaft 44, and cannot rotate about the first axis C1 of the side gear shaft 44. As shown in FIG. 4, when the nut member 90 is rotated by the electric motor 74 about the first axis C1 in the direction of arrow F1, the nut member 90 moves, through screw action with the screw shaft member 92, away from the frictional engagement elements 82 of the friction clutch 72, or the direction of arrow F2, in the direction of the first axis C1. Also, when the nut member 90 is rotated by the electric motor 74 about the first axis C1 in a direction opposite to the direction of arrow F1, or the direction of arrow F3, the nut member 90 moves, through screw action with the screw shaft member 92, moves in a direction opposite to the direction of arrow F2, or the direction of arrow F4, in the direction of the first axis C1.

The worm gear 88 is a pair of gears including a worm 100 formed integrally with a motor shaft of the electric motor 74, and a worm wheel 102 fixed to a flange portion 90a formed in an end portion of the nut member 90 on the rear wheel 16R side. With the electric motor 74 rotated/driven, the worm wheel 102 coupled or fixed to the nut member 90 moves in the direction of the first axis C1 of the side gear shaft 44. The width dimension of the worm wheel 102 as measured in the direction of the first axis C1 is set to be larger than the width dimension of the worm 100 formed on the motor shaft as measured in the direction of the first axis C1, so that the worm wheel 102 constantly meshes with the worm 100 formed on the motor shaft of the electric motor 74 fixed to the case member 70, even when the worm wheel 102 is moved. The worm wheel 102 has outer circumferential teeth 102a in the form of spur teeth.

As shown in FIG. 4 and FIG. 5, the piston 84 of the friction clutch 72 includes, integrally, a cylindrical base end portion 84a mounted on the nut member 90, an annular pressing portion 84b that depresses the frictional engagement elements 82, a connecting portion 84c that connects the base end portion 84a with the pressing portion 84b, and first meshing teeth 84d formed on the inner periphery of the annular pressing portion 84b. The cylindrical base end portion 84a is mounted on the nut member 90 such that it can rotate relative to the nut member 90 about the first axis C1 of the side gear shaft 44 and cannot move relative to the nut member 90 in the direction of the first axis C1 of the side gear shaft 44. The annular pressing portion 84b is disposed between the second cylindrical portion 78b of the clutch drum 78 and the second cylindrical portion 80d of the clutch hub 80. The first meshing teeth 84d are spline-fitted to outer circumferential spline teeth 80c formed on the second cylindrical portion 80d of the clutch hub 80. As shown in FIG. 4 and FIG. 5, a thrust bearing 104 is interposed between the piston 84 and the flange portion 90a of the nut member 90. Also, an annular stopper member 106 for inhibiting movement of the piston 84 relative to the nut member 90 toward the frictional engagement elements 82 is provided at an end portion of the nut member 90 on a side opposite to the flange portion 90a side. Therefore, the piston 84 is mounted on the nut member 90 such that it can rotate relative to the nut member 90 about the first axis C1 of the side gear shaft 44, and cannot move relative to the nut member 90 in the direction of the first axis C1 of the side gear shaft 44, due to the thrust bearing 104 and the stopper member 106. Also, the first meshing teeth 84d of the piston 84 are spline-fitted to the outer circumferential spline teeth 80c formed on the second cylindrical portion 80d of the clutch hub 80. Therefore, the piston 84 is mounted on the nut member 90 such that it cannot rotate relative to the clutch hub 80 about the first axis C1 of the side gear shaft 44, and can move relative to the clutch hub 80 in the direction of the first axis C1 of the side gear shaft 44. The axis of rotation of each of the side gears 56, 58, differential case 46, clutch drum 78, clutch hub 80, piston 84, nut member 90, and the worm wheel 102 coincides with the first axis C1 of the side gear shaft 44.

As shown in FIG. 5, the inner circumferential spline teeth 78e formed on the second cylindrical portion 78b of the clutch drum 78 are formed with meshing teeth 78f that protrude from an end portion of the inner circumferential spline teeth 78e on the piston 84 side, toward the pressing portion 84b of the piston 84. Also, the pressing portion 84b of the piston 84 is formed with second meshing teeth (meshing teeth) 84e that protrude from a part of the outer periphery of the pressing portion 84b toward the inner circumferential spline teeth 78e formed on the second cylindrical portion 78b of the clutch drum 78. The second meshing teeth 84e can mesh with the meshing teeth 78f formed on the inner circumferential spline teeth 78e. The position of the second meshing teeth 84e formed on the pressing portion 84b of the piston 84 in the direction of the first axis C1 is set, so that the second meshing teeth 84e do not mesh with the meshing teeth 78f formed on the clutch drum 78, at a position where the pressing portion 84b of the piston 84 contacts with the frictional engagement elements 82 of the friction clutch 72 as shown on the upper side (closer to the engine 12) of the friction clutch 72 with respect to the first axis C1 in FIG. 4. The position of the second meshing teeth 84e formed on the pressing portion 84b of the piston 84 in the direction of the first axis C1 is also set, so that the second meshing teeth 84e mesh with the meshing teeth 78f formed on the clutch drum 78, at a position where the pressing portion 84b of the piston 84 is spaced a given distance A from the frictional engagement elements 82 of the friction clutch 72, as shown on the lower side (opposite to the engine 12 side) of the friction clutch 72 with respect to the first axis C1 in FIG. 4. Also, the diameter D of an addendum circle of the second meshing teeth 84e formed on the pressing portion 84b of the piston 84 is set to be smaller than the diameter D1 of an addendum circle of the inner circumferential spline teeth 78e formed on the second cylindrical portion 78b of the clutch drum 78, and set to be larger than the diameter D2 of an addendum circle of the meshing teeth 78f formed on the second cylindrical portion 78b of the clutch drum 78.

In the differential limiting device 66 constructed as described above, the amount of rotation of the electric motor 74 is controlled by the electronic control unit (not shown), so that the amount of movement of the nut member 90 of the screw mechanism 76 in the direction of the first axis C1 is controlled. When the nut member 90 is rotated by the electric motor 74 about the first axis C1 in the direction of arrow F3, and the piston 84 mounted on the nut member 90 moves in the direction of arrow F4, so as to be closer to the frictional engagement elements 82 and depress the elements 82, the first friction plates 82a and second friction plates 82b of the frictional engagement elements 82 are depressed by the piston 84. As a result, the differential case 46 coupled to the clutch drum 78 and the side gear shaft 44 coupled to the clutch hub 80 rotate as a unit, and differential limiting torque for limiting differential rotation of the pair of side gears 56 and 58 is generated in the rear-wheel differential device 30. When the nut member 90 is rotated by the electric motor 74 about the first axis C1 in the direction of arrow F1, from a condition where the frictional engagement elements 82 are depressed by the piston 84 as shown in FIG. 5, and the piston 84 mounted on the nut member 90 moves in the direction of arrow F2, away from the frictional engagement elements 82, or in a direction opposite to the direction in which the piston 84 depresses the frictional engagement elements 82, the second meshing teeth 84e formed on the pressing portion 84b of the piston 84 mesh with the meshing teeth 78f formed on the second cylindrical portion 78b of the clutch drum 78. Therefore, the piston 84 and the clutch drum 78 are engaged such that they cannot rotate relative to each other, and the differential case 46 coupled to the clutch drum 78 and the side gear shaft 44 coupled to the clutch hub 80 are engaged such that they cannot rotate relative to each other, so that differential rotation of the pair of side gears 56 and 58 is limited.

As described above, the differential limiting device 66 of this embodiment includes the friction clutch 72, electric motor 74, and the screw mechanism 76. The friction clutch 72 has the clutch drum 78 coupled to the differential case 46 of the rear-wheel differential device 30, clutch hub 80 coupled to the side gear shaft 44, the plurality of frictional engagement elements 82 that are relatively non-rotatably engaged with one or the other of the clutch hub 80 and the clutch drum 78, and overlap with each other such that they can frictionally contact with each other, and the piston 84 that depresses the frictional engagement elements 82. In the screw mechanism 76, the nut member 90 as the screw member is rotated/driven by the electric motor 74 about the first axis C1 of the side gear shaft 44, so that rotary motion of the electric motor 74 is converted into linear motion of the nut member 90 in the direction of the first axis C1 of the side gear shaft 44. The screw member may be either one of the screw shaft member 92 and the nut member 90 that are screwed together. The piston 84 is mounted on the nut member 90 such that it can rotate relative to the nut member 90 about the first axis C1 of the side gear shaft 44, and cannot move relative to the nut member 90 in the direction of the first axis C1 of the side gear shaft 44. The piston 84 also cannot rotate relative to the clutch hub 80 about the first axis C1 of the side gear shaft 44, and can move relative to the clutch hub 80 in the direction of the first axis C1. When the piston 84 is moved by the nut member 90 in a direction opposite to the direction to depress the frictional engagement elements 82, the piston 84 and the clutch drum 78 are engaged so as to be unable to rotate relative to each other. Therefore, when the rotary motion of the electric motor 74 is converted by the screw mechanism 76 into the linear motion of the nut member 90 in the direction of the first axis C1 of the side gear shaft 44, and the piston 84 mounted on the nut member 90 is moved in the direction opposite to the direction to depress the frictional engagement elements 82, the piston 84 and the clutch drum 78 are engaged so as to be unable to rotate relative to each other. As a result, differential rotation of the pair of side gears 56 and 58 is mechanically limited. Thus, rotation of one electric motor 74 makes it possible to generate differential limiting torque for limiting differential rotation of the pair of side gears 56 and 58 in the rear-wheel differential device 30, or mechanically limit differential rotation of the pair of side gears 56 and 58. Consequently, the number of constituent elements of the differentia limiting device 55 can be favorably reduced, and the differential limiting device 66 can be favorably reduced in size, as compared with a known differential limiting device for a vehicle to which a mechanism for engaging and disengaging a dog clutch, namely, an actuator for engaging and disengaging the dog clutch, is added, only for the purpose of mechanically limiting differential rotation of the pair of side gears 56 and 58, for example.

According to the differential limiting device 66 of this embodiment, the piston 84 is spline-fitted to the clutch hub 80 such that it can move in the direction of the first axis C1 of the side gear shaft 44, and it cannot rotate relative to the clutch hub 80. Further, the piston 84 is formed with the second meshing teeth 84e that can mesh with the meshing teeth 78f formed on the clutch drum 78. When the piston 84 is moved by the nut member 90 in the direction opposite to the direction to depress the frictional engagement elements 82, the second meshing teeth 84e formed on the piston 84 mesh with the meshing teeth 78f formed on the clutch drum 78. Therefore, when the piston 84 is moved in the direction opposite to the direction to depress the frictional engagement elements 82, the second meshing teeth 84e formed on the piston 84 mesh with the meshing teeth 78f formed on the clutch drum 78, so that the piston 84 and the clutch drum 78 are engaged so as to be unable to rotate relative to each other.

According to the differential limiting device 66 of this embodiment, the nut member 90 is supported by the side gear shaft 44 such that it can rotate about the first axis C1 of the side gear shaft 44, and the screw shaft member 92 is supported by the side gear shaft 44 such that it cannot move relative to the nut member 90 in the direction of the first axis C1 of the side gear shaft 44 and cannot rotate about the first axis C1 of the side gear shaft 44. Thus, when the nut member 90 is rotated/driven by the electric motor 74, the nut member 90 moves in the direction of the first axis C1 of the side gear shaft 44, and the linear motion of the nut member 90 in the direction of the first axis C1 of the side gear shaft 44 is transmitted to the friction clutch 72.

Also, according to the differential limiting device 66 of this embodiment, the electric motor 74 is coupled to the nut member 90 of the screw mechanism 76 via the worm gear 88. Therefore, it is possible to replace the electric motor 74 with a relatively low output, small-sized motor, while keeping torque of the nut member 90 about the first axis C1 of the side gear shaft 44, which is provided by the motor 74.

Also, according to the differential limiting device 66 of this embodiment, the nut member 90 is screwed on the screw shaft member 92 via the plurality of balls 96. Therefore, the nut member 90 and the screw shaft member 92 smoothly rotate relative to each other, and electric power required by the electric motor 74 when the piston 84 moves in the direction to depress the frictional engagement elements 82 or moves in the direction opposite to the direction to depress the frictional engagement elements 82 is stably reduced.

Next, another embodiment of the disclosure will be described. The same reference numerals are assigned to portions or components that are common to this embodiment and the above first embodiment, and these portions or components will not be described.

Figure 6:
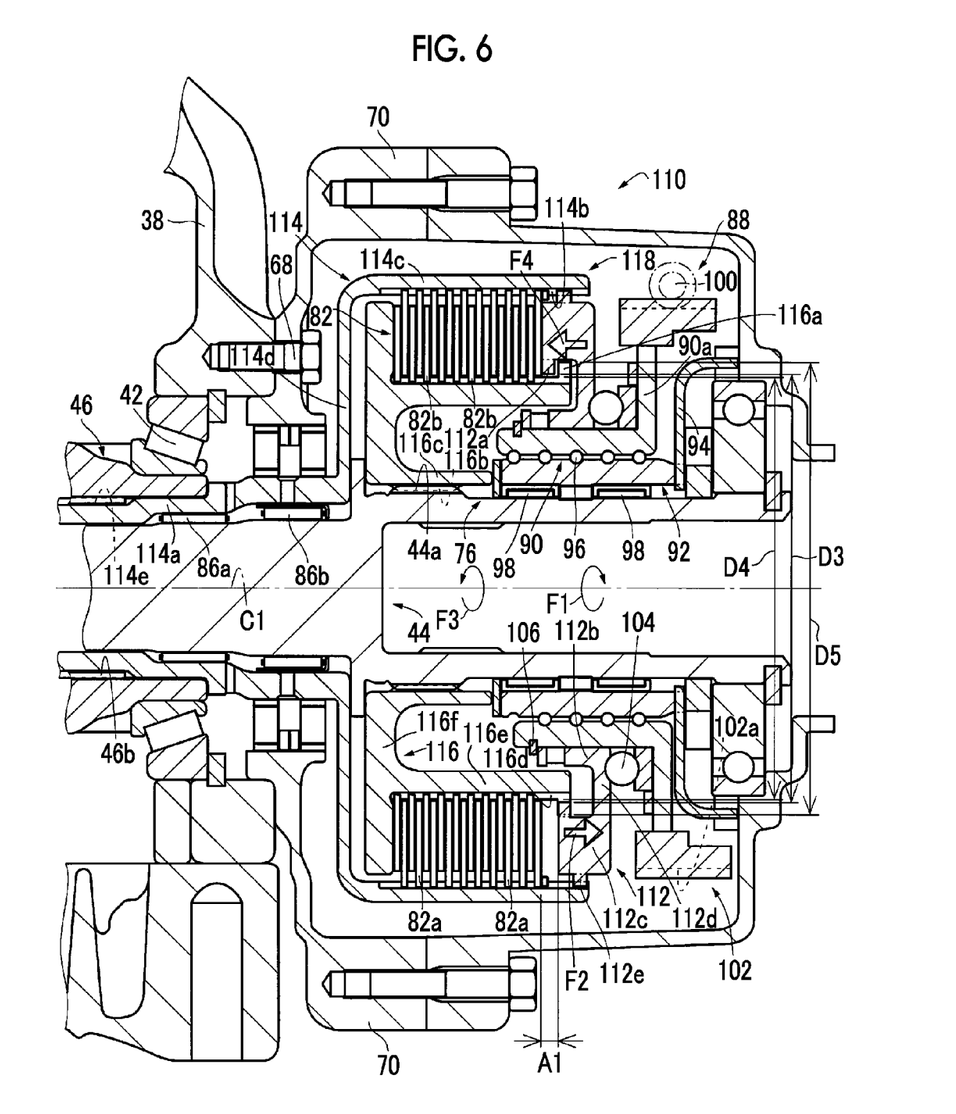
FIG. 6 is a view illustrating the general configuration of a differential limiting device as another embodiment of the disclosure.

FIG. 6 shows a differential limiting device 110 according to another embodiment of the disclosure. The differential limiting device 110 of this embodiment is different from the differential limiting device 66 of the first embodiment in that a piston 112 is mounted on the nut member 90 such that it cannot rotate relative to a clutch drum 114 about the first axis C1 of the side gear shaft 44, and it can move in the direction of the first axis C1, and that the piston 112 is formed with first meshing teeth (meshing teeth) 112a that can mesh with meshing teeth 116a formed on the clutch hub 116. In other respects, the differential limiting device 110 of this embodiment is substantially identical with the differential limiting device 66 of the first embodiment.

As shown in FIG. 6, the clutch drum 114 includes, integrally, a first cylindrical portion 114a that is supported by the side gear shaft 44 via needle bearings 86a, 86b, so as to be rotatable relative to the side gear shaft 44, a second cylindrical portion 114c disposed on the radially outer side of the clutch hub 116, and a connecting portion 114d that connects the first cylindrical portion 114a with the second cylindrical portion 114c. The second cylindrical portion 114c is formed at its inner periphery with inner circumferential spline teeth 114b. The first cylindrical portion 114a of the clutch drum 114 is formed with outer circumferential spline teeth 114e that are spline-fitted to inner circumferential spline teeth 46b formed on the differential case 46, and the clutch drum 114 and the differential case 46 are coupled to each other such that they cannot rotate relative to each other. The outer circumferential teeth 82c formed on the first friction plates 82a (see FIG. 5) are engaged with the inner circumferential spline teeth 114b of the clutch drum 114, such that the first friction plates 82a can move relative to the clutch drum 114 in the direction of the first axis C1, and cannot rotate relative to the clutch drum 114 about the first axis C1.

As shown in FIG. 6, the clutch hub 116 includes, integrally, a first cylindrical portion 116c formed with inner circumferential spline teeth 116b spline-fitted to outer circumferential spline teeth 44a formed on the side gear shaft 44, a second cylindrical portion 116e disposed radially inward of the second cylindrical portion 114c of the clutch drum 114, and a connecting portion 116f that connects the first cylindrical portion 116c with the second cylindrical portion 116e. The second cylindrical portion 116e is formed at its outer periphery with outer circumferential spline teeth 116d. The clutch hub 116 and the side gear shaft 44 are coupled to each other such that they cannot rotate relative to each other. The inner circumferential teeth 82d (see FIG. 5) formed on the second friction plates 82b are engaged with the outer circumferential spline teeth 116d of the clutch hub 116, such that the second friction plates 82b can move relative to the clutch hub 116 in the direction of the first axis C1, and cannot rotate relative to the clutch hub 116 about the first axis C1.

As shown in FIG. 6, the piston 112 of the friction clutch 118 includes, integrally, a cylindrical base end portion 112b, an annular pressing portion 112c disposed between the second cylindrical portion 114c of the clutch drum 114 and the second cylindrical portion 116e of the clutch hub 116, a connecting portion 112d that connects the base end portion 112b with the pressing portion 112c, and second meshing teeth 112e formed on the outer periphery of the annular pressing portion 112c. The cylindrical base end portion 112b is mounted on the nut member 90 such that it can rotate relative to the nut member 90 about the first axis C1 of the side gear shaft 44 and cannot move relative to the nut member 90 in the direction of the first axis C1 of the side gear shaft 44, in the presence of the thrust bearing 104 and the stopper member 106. The annular pressing portion 112c depresses the frictional engagement elements 82. The second meshing teeth 112e are spline-fitted to inner circumferential spline teeth 114b formed on the second cylindrical portion 114c of the clutch drum 114. The second meshing teeth 112e of the piston 112 are spline-fitted to the inner circumferential spline teeth 114b formed on the second cylindrical portion 114c of the clutch drum 114. Therefore, the piston 112 is mounted on the nut member 90 such that it cannot rotate relative to the clutch drum 114 about the first axis C1 of the side gear shaft 44, and can move relative to the clutch drum 114 in the direction of the first axis C1 of the side gear shaft 44. The axis of rotation of each of the clutch drum 114, clutch hub 116, and the piston 112 coincides with the first axis C1 of the side gear shaft 44.

As shown in FIG. 6, the outer circumferential spline teeth 116d formed on the second cylindrical portion 116e of the clutch hub 116 is formed with meshing teeth 116a that protrude from an end portion of the outer circumferential spline teeth 116d closer to the piston 112, toward the pressing portion 112c of the piston 112. Also, the pressing portion 112c of the piston 112 is formed with first meshing teeth 112a that protrude from a part of the inner periphery of the pressing portion 112c, toward the outer circumferential spline teeth 116d formed on the second cylindrical portion 116e of the clutch hub 116. The first meshing teeth 112a can mesh with the meshing teeth 116a formed on the outer circumferential spline teeth 116d. The position of the first meshing teeth 112a in the pressing portion 112c of the piston 112 in the direction of the first axis C1 is set so that the first meshing teeth 112a do not mesh with the meshing teeth 116a formed on the clutch hub 116, at a position where the pressing portion 112c of the piston 112 is in contact with the frictional engagement elements 82, as shown on the upper side (the engine 12 side) of the friction clutch 118 with respect to the first axis C1 in FIG. 6. Also, the position of the first meshing teeth 112a in the pressing portion 112c of the piston 112 in the direction of the first axis C1 is set so that the first meshing teeth 112a mesh with the meshing teeth 116a formed on the clutch hub 116, at a position where the pressing portion 112c of the piston 112 is spaced a given distance A1 from the frictional engagement elements 82, as shown on the lower side (opposite to the engine 12) of the friction clutch 118 with respect to the first axis C1 in FIG. 6. The diameter D3 of an addendum circle of the first meshing teeth 112a formed on the pressing portion 112c of the piston 112 is set to be larger than the distance D4 of an addendum circle of the outer circumferential spline teeth 116d formed on the second cylindrical portion 116e of the clutch hub 116, and set to be smaller than the diameter D5 of an addendum circle of the meshing teeth 116a formed on the second cylindrical portion 116e of the clutch hub 116.

In the differential limiting device 110 constructed as described above, when the nut member 90 is rotated by the electric motor 74 about the first axis C1 in the direction of arrow F3, and the piston 112 mounted on the nut member 90 moves in such a direction as to depress the frictional engagement elements 82, namely, the piston 112 moves in the direction of arrow F4, the first friction plates 82a and the second friction plates 82b of the frictional engagement elements 82 are depressed by the piston 112. Therefore, the differential case 46 coupled to the clutch drum 114 and the side gear shaft 44 coupled to the clutch hub 116 rotate as a unit, and differential limiting torque for limiting differential rotation of the pair of side gears 56 and 58 is generated in the rear-wheel differential device 30. Also, when the nut member 90 is rotated by the electric motor 74 about the first axis C1 in the direction of arrow F1, from a condition where the frictional engagement elements 82 are depressed by the piston 112, and the piston 112 mounted on the nut member 90 moves in a direction opposite to the direction to depress the frictional engagement elements 82, namely, the piston 112 moves in the direction of arrow F2, the first meshing teeth 112a formed on the pressing portion 112c of the piston 112 mesh with the meshing teeth 116a formed on the second cylindrical portion 116e of the clutch hub 116. Therefore, the piston 112 and the clutch hub 116 are coupled to each other such that they cannot rotate relative to each other, and the differential case 46 coupled to the clutch drum 114 and the side gear shaft 44 coupled to the clutch hub 116 are coupled to each other so as to be unable to rotate relative to each other, so that differential rotation of the pair of the side gears 56 and 58 is mechanically limited.

As described above, the differential limiting device 110 of this embodiment includes the friction clutch 118, electric motor 74, and the screw mechanism 76. The friction clutch 118 has the clutch drum 114 coupled to the differential case 46 of the rear-wheel differential device 30, clutch hub 116 coupled to the side gear shaft 44, the plurality of frictional engagement elements 82 that are relatively non-rotatably engaged with one or the other of the clutch hub 116 and the clutch drum 114, and overlap with each other such that they can be in friction contact with each other, and the piston 112 that depresses the frictional engagement elements 82. The nut member 90 as the screw member is rotated/driven by the electric motor 74 about the first axis C1 of the side gear shaft 44, so that rotary motion of the electric motor 74 is converted into linear motion of the nut member 90 in the direction of the first axis C1 of the side gear shaft 44. The piston 112 is mounted on the nut member 90 such that the piston 112 can rotate relative to the nut member 90 about the first axis C1 of the side gear shaft 44, and cannot move relative to the nut member 90 in the direction of the first axis C1 of the side gear shaft 44. The piston 112 also cannot rotate relative to the clutch drum 114 about the first axis C1 of the side gear shaft 44, and can move relative to the clutch drum 114 in the direction of the first axis C1. When the piston 112 is moved by the nut member 90 in the direction opposite to the direction to depress the frictional engagement elements 82, the piston 112 and the clutch hub 116 are engaged such that they cannot rotate relative to each other. Thus, when rotary motion of the electric motor 74 is converted by the screw mechanism 76 into linear motion of the nut member 90 in the direction of the first axis C1 of the side gear shaft 44, and the piston 112 mounted on the nut member 90 is moved in the direction opposite to the direction to depress the frictional engagement elements 82, the piston 112 and the clutch hub 116 are engaged with each other such that they cannot rotate relative to each other. As a result, differential rotation of the pair of side gears 56 and 58 is mechanically limited. Thus, rotation of one electric motor 74 makes it possible to generate differential limiting torque for limiting differential rotation of the pair of side gears 56 and 58 in the rear-wheel differential device 30, and mechanically limit differential rotation of the pair of side gears 56 and 58. Thus, the number of components that constitute the differential limiting device 110 can be favorably reduced, and the differential limiting device 110 can be favorably reduced in size, as compared with a differential limiting device for a vehicle to which a mechanism for engaging and disengaging a dog clutch, namely, an actuator for engaging and disengaging the dog clutch, is added, only for the purpose of mechanically limiting differential rotation of the pair of side gears 56 and 58, for example.

Also, according to the differential limiting device 110 of this embodiment, the piston 112 is spline-fitted to the clutch drum 114 such that it can move in the direction of the first axis C1 of the side gear shaft 44, and cannot rotate relative to the clutch drum 114. Further, the piston 112 is formed with the first meshing teeth 112a that can mesh with the meshing teeth 116a formed on the clutch hub 116. When the piston 112 is moved by the nut member 90 in the direction opposite to the direction to depress the frictional engagement elements 82, the first meshing teeth 112a formed on the piston 112 mesh with the meshing teeth 116a formed on the clutch hub 116. Thus, when the piston 112 is moved in the direction opposite to the direction to depress the frictional engagement elements 82, the first meshing teeth 112a formed on the piston 112 mesh with the meshing teeth 116a formed on the clutch hub 116, so that the piston 112 and the clutch hub 116 are engaged such that they are cannot rotate relative to each other.

Figure 7:
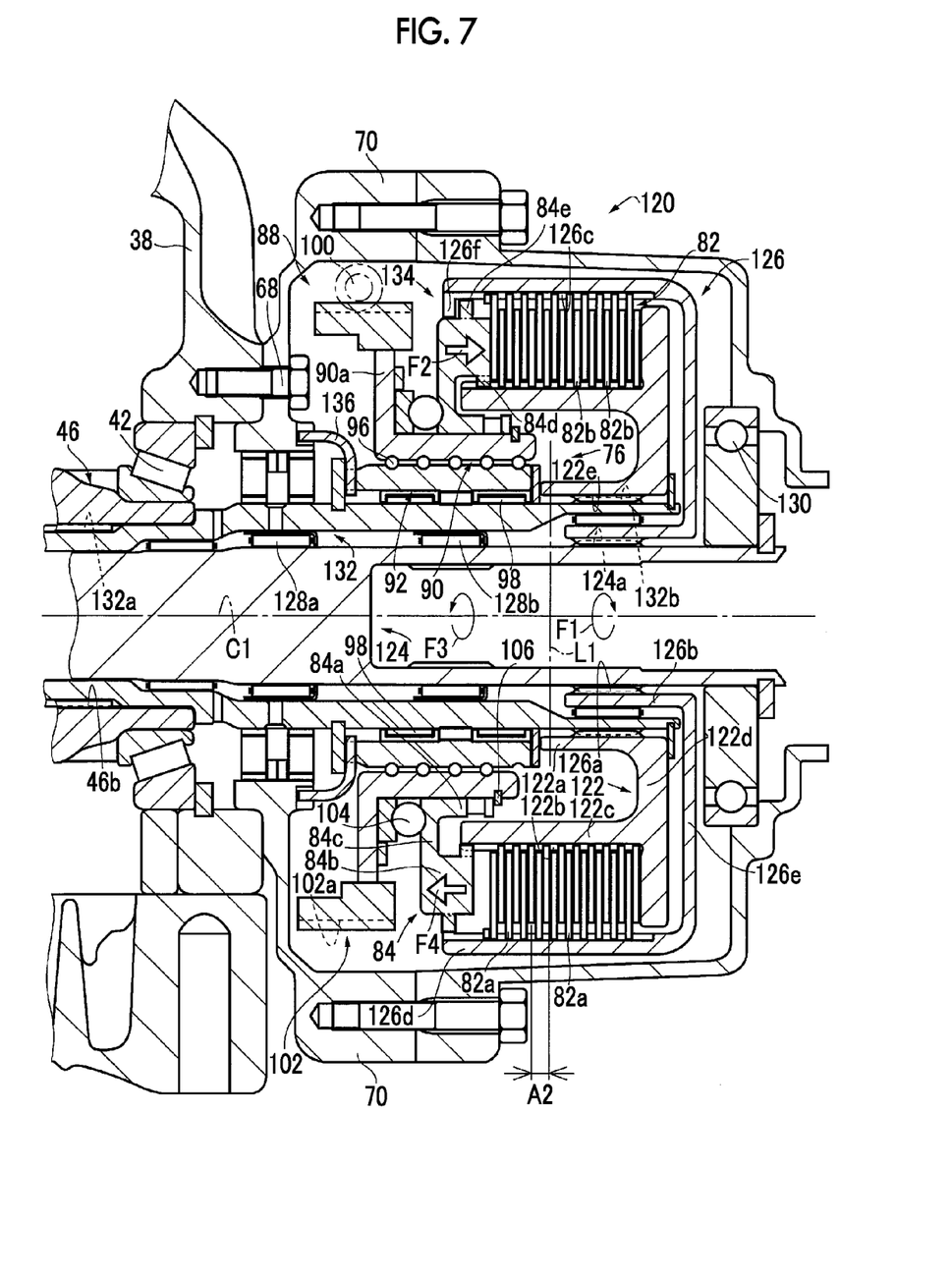
FIG. 7 is a view illustrating the general configuration of a differential limiting device as another embodiment of the disclosure.

FIG. 7 shows a differential limiting device 120 according to another embodiment of the disclosure. The differential limiting device 120 of this embodiment is different from the differential limiting device 66 of the first embodiment in that the differential case 46 is coupled to a clutch hub 122 such that power can be transmitted therebetween, and that a side gear shaft 124 is coupled to a clutch drum 126 such that power can be transmitted therebetween. In other respects, the differential limiting device 120 is substantially identical with the differential limiting device 66 of the first embodiment. In the differential limiting device 120 of this embodiment, the electric motor 74, worm gear 88, screw mechanism 76, thrust bearing 104, stopper member 106, and the piston 84 are located so as to be reversed with respect to line L1 (see FIG. 7) perpendicular to the first axis C1 of the side gear shaft 124, as compared with the differential limiting device 66 of the first embodiment. Also, the screw shaft member 92 is supported by the side gear shaft 124 via a cylindrical member 132 that will be described later, such that the screw shaft member 92 cannot move relative to the nut member 90 in the direction of the first axis C1, and cannot rotate about the first axis C1, owing to a connecting member 136 having substantially the same function as the connecting member 94 of the first embodiment 1 and a first cylindrical portion 122a of the clutch hub 122. As shown in FIG. 7, when the nut member 90 is rotated by the electric motor 74 about the first axis C1 in the direction of arrow F1, the nut member 90 moves away from the frictional engagement elements 82 in the direction of the first axis C1, namely, moves in the direction of arrow F4, through the screw action with the screw shaft member 92. Also, when the nut member 90 is rotated by the electric motor 74 about the first axis C1 in a direction opposite to the direction of arrow F1, namely, in the direction of arrow F3, the nut member 90 moves in a direction opposite to the direction of arrow F4 in the direction of the first axis C1, namely, in the direction of arrow F2, through the screw action with the screw shaft member 92.

As shown in FIG. 7, the clutch drum 126 includes, integrally, a first cylindrical portion 126b, a second cylindrical portion 126d, and a connecting portion 126e that connects the first cylindrical portion 126b with the second cylindrical portion 126d. The first cylindrical portion 126b is formed with first inner circumferential spline teeth 126a spline-fitted to outer circumferential spline teeth 124a formed on the side gear shaft 124. The second cylindrical portion 126d is disposed on the radially outer side of the clutch hub 122, and is formed at its inner periphery with second inner circumferential spline teeth 126c. The clutch drum 126 and the side gear shaft 124 are coupled to each other such that they cannot rotate relative to each other. The side gear shaft 124 coupled to the side gear 58 is supported by a bearing 130 provided on the case member 70, side gear 58, etc., such that the side gear shaft 124 can rotate about the first axis C1, like the side gear shaft 44 of the first embodiment. Also, the outer circumferential teeth 82c (see FIG. 5) formed on the first friction plates 82a are engaged with the second inner circumferential spline teeth 126c of the clutch drum 126, such that the first friction plates 82a can move relative to the clutch drum 126 in the direction of the first axis C1, and cannot rotate relative to the clutch drum 126.

As shown in FIG. 7, the clutch hub 122 includes, integrally, a first cylindrical portion 122a, a second cylindrical portion 122c, and a connecting portion 122d that connects the first cylindrical portion 122a with the second cylindrical portion 122c. The first cylindrical portion 122a is supported via needle bearings 128a, 128b, etc. so as to be able to rotate relative to the side gear shaft 124. The second cylindrical portion 122c is disposed radially inward of the second cylindrical portion 126d of the clutch drum 126, and is formed at its outer periphery with outer circumferential spline teeth 122b. Between the clutch hub 122 and the differential case 46, a cylindrical member 132 formed in a cylindrical shape is provided which connects a power transmission path between the clutch hub 122 and the differential case 46. Namely, an end portion of the cylindrical member 132 closer to the differential case 46 is formed with outer circumference spline teeth 132a that are spline-fitted to the inner circumferential spline teeth 46b of the differential case 46, and an end portion of the cylindrical member 132 remote from the differential case 46 is formed with outer circumferential spline teeth 132b that are spline-fitted to inner circumferential spline teeth 122e formed on the first cylindrical portion 122a of the clutch hub 122. Also, the inner circumferential teeth 82d (see FIG. 5) formed on the second friction plates 82b are engaged with outer circumferential spline teeth 122b of the clutch hub 122, such that the second friction plates 82b can move relative to the clutch hub 122 in the direction of the first axis C1 and cannot rotate relative to the clutch hub 122 about the first axis C1.

As shown in FIG. 7, the second inner circumferential spline teeth 126c formed on the second cylindrical portion 126d of the clutch drum 126 are formed with engaging teeth 126f that protrude from an end portion of the second inner circumferential spline teeth 126c closer to the piston 84, toward the pressing portion 84b of the piston 84. The position of the meshing teeth 126f in the second inner circumferential spline teeth 126c formed on the clutch drum 126 in the direction of the first axis C1 is set, so that the second meshing teeth 84e formed on the pressing portion 84b of the piston 84 do not mesh with the meshing teeth 126f formed on the clutch drum 126, at a position where pressing portion 84b of the piston 84 contacts with the frictional engagement elements 82, as shown on the upper side (engine 12 side) of the friction clutch 134 with respect to the first axis C1 in FIG. 7, and the second meshing teeth 84e mesh with the meshing teeth 126f formed on the clutch drum 126, at a position where the pressing portion 84b of the piston 84 is spaced a given distance A2 apart from the frictional engagement elements 82 of the friction clutch 134, as shown on the lower side (opposite to the engine 12 side) of the friction clutch 134 with respect to the first axis C1 in FIG. 7.

In the differential limiting device 120 constructed as described above, when the nut member 90 is rotated by the electric motor 74 about the first axis C1 in the direction of arrow F3, and the piston 84 mounted on the nut member 90 moves in such a direction as to depress the frictional engagement elements 82, namely, the piston 84 moves in the direction of arrow F2, the first friction plates 82a and the second friction plates 82b are depressed by the piston 84. As a result, the side gear shaft 124 coupled to the clutch drum 126 and the differential case 46 coupled to the clutch hub 122 rotate as a unit, and differential limiting torque for limiting differential rotation of the pair of side gears 56 and 58 is generated in the rear-wheel differential device 30. Also, when the nut member 90 is rotated by the electric motor 74 about the first axis C1 in the direction of arrow F1, and the piston 84 mounted on the nut member 90 moves in a direction opposite to the direction to depress the frictional engagement elements 82, namely, the piston 84 moves in the direction of arrow F4, the second meshing teeth 84e formed on the pressing portion 84b of the piston 84 mesh with the meshing teeth 126f formed on the second cylindrical portion 126d of the clutch drum 126. As a result, the piston 84 and the clutch drum 126 are engaged such that they cannot rotate relative to each other, and the side gear shaft 124 coupled to the clutch drum 126 and the differential case 46 coupled to the clutch hub 122 are engaged so as to be unable to be rotated relative to each other, so that differential rotation of the pair of side gears 56 and 58 is mechanically limited (restricted).

As described above, the differential limiting device 120 of this embodiment includes the friction clutch 134, electric motor 74, and the screw mechanism 76 that converts rotary motion of the electric motor 74 into linear motion of the nut member 90 in the direction of the first axis C1 of the side gear shaft 124, when the nut member 90 as one screw member of the screw shaft member 92 and the nut member 90 that are screwed together is rotated/driven by the electric motor 74 about the first axis C1 of the side gear shaft 124. The friction clutch 134 has the clutch hub 122 coupled to the differential case 46 of the rear-wheel differential device 30, clutch drum 126 coupled to the side gear shaft 124, the plurality of frictional engagement elements 82 that are relatively non-rotatably engaged with one or the other of the clutch hub 122 and the clutch drum 126, and overlap with each other such that they can be in friction contact with each other, and the piston 84 that depresses the frictional engagement elements 82. The piston 84 is mounted on the nut member 90 such that it can rotate relative to the nut member 90 about the first axis C1 of the side gear shaft 124, and cannot move relative to the nut member 90 in the direction of the first axis C1 of the side gear shaft 124. The piston 84 is also mounted on the clutch hub 122 such that it cannot rotate relative to the clutch hub 122 about the first axis C1 of the side gear shaft 124 and can move relative to the clutch hub 122 in the direction of the first axis C1. When the piston 84 is moved by the nut member 90 in the direction opposite to the direction to depress the frictional engagement elements 82, the piston 84 and the clutch drum 126 are engaged such that they cannot rotate relative to each other. Thus, when rotary motion of the electric motor 74 is converted by the screw mechanism 76 into linear motion of the nut member 90 in the direction of the first axis C1 of the side gear shaft 124, and the piston 84 mounted on the nut member 90 is moved in the direction opposite to the direction to depress the frictional engagement elements 82, the piston 84 and the clutch drum 126 are engaged to be unable to rotate relative to each other, so that differential rotation of the pair of side gears 56 and 58 is mechanically limited. Thus, rotation of one electric motor 74 makes it possible to generate differential limiting torque for limiting differential rotation of the pair of side gears 56 and 58 in the rear-wheel differential device 30, and mechanically limit differential rotation of the pair of side gears 56 and 58. Thus, the number of components that constitute the differential limiting device 120 can be favorably reduced, and the differential limiting device 120 can be favorably reduced in size, as compared with a differential limiting device for a vehicle to which a mechanism for engaging and disengaging a dog clutch, namely, an actuator for engaging and disengaging the dog clutch, is added, only for the purpose of mechanically limiting differential rotation of the pair of side gears 56 and 58, for example.

Figure 8:
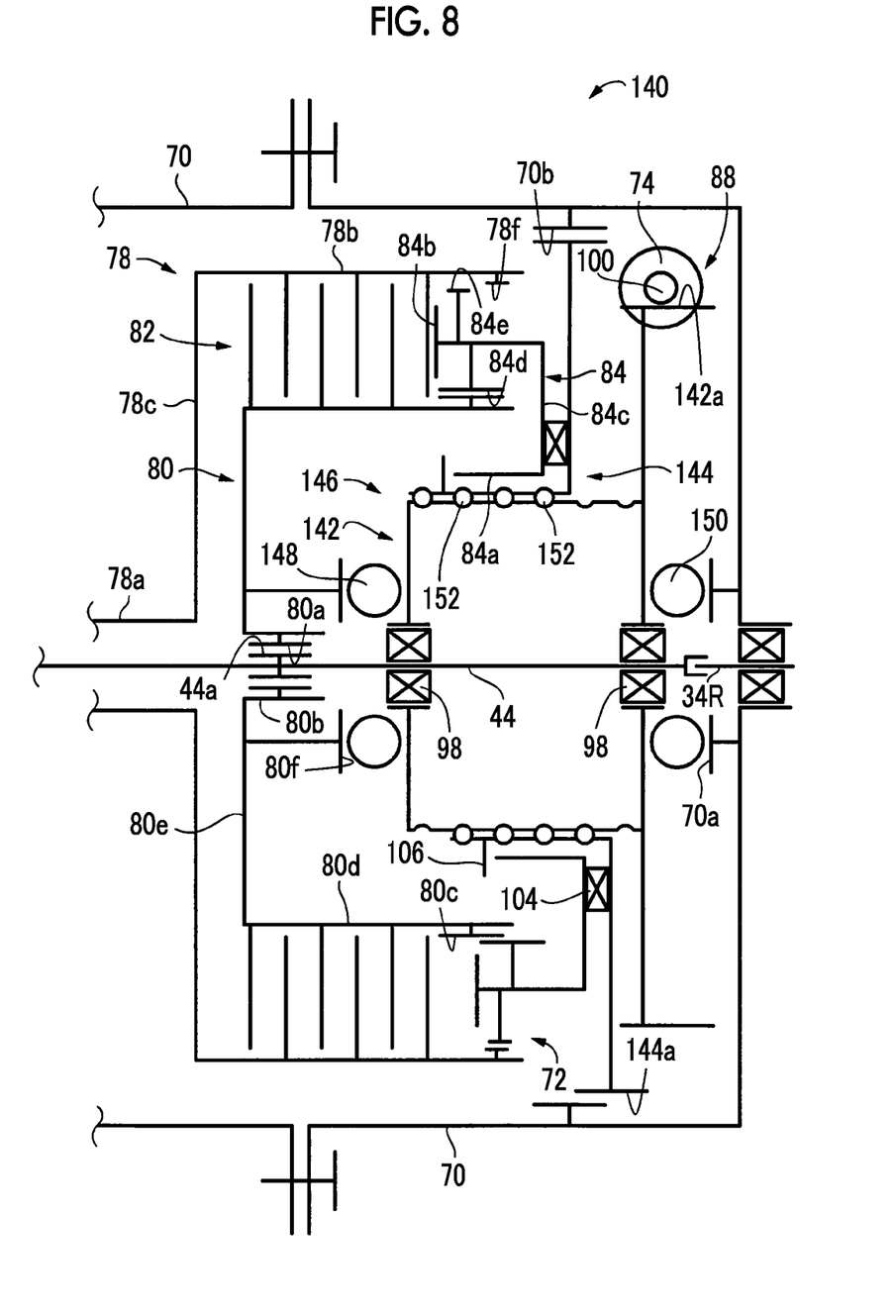
FIG. 8 is a skeleton diagram illustrating the general configuration of a differential limiting device as another embodiment of the disclosure.

FIG. 8 shows a differential limiting device 140 according to another embodiment of the disclosure. The differential limiting device 140 of this embodiment is different from the differential limiting device 66 of the first embodiment in that the structure of the screw mechanism 76 is changed into a screw mechanism 146, in which a screw shaft member (one of screw members) 142 is rotated/driven by the electric motor 74, so that a nut member 144 is moved in the direction of the first axis C1 of the side gear shaft 44. In other respects, the differential limiting device 140 of this embodiment is substantially identical with the differential limiting device 66 of the first embodiment.

As shown in FIG. 8, the connecting portion 80e of the clutch hub 80 is formed with a protruding portion 80f that protrudes toward an end portion of the screw shaft member 142 on a side opposite to the rear wheel 16R side, and a first thrust bearing 148 is disposed between the protruding portion 80f and the end portion of the screw shaft member 142 on the side opposite to the rear wheel 16R side. Also, the case member 70 is formed with a protruding portion 70a that protrudes toward an end portion of the screw shaft member 142 on the rear wheel 16R side, and a second thrust bearing 150 is disposed between the protruding portion 70a and the end portion of the screw shaft member 142 on the rear wheel 16R side. The screw shaft member 142 is supported by the side gear shaft 44 via the needle bearings 98, such that it can rotate relative to the side gear shaft 44. Namely, the screw shaft member 142 is supported by the side gear shaft 44, such that it cannot move in the direction of the first axis C1 of the side gear shaft 44 in the presence of the protruding portion 80f of the clutch hub 80 and the protruding portion 70a of the case member 70, and can rotate about the first axis C1 of the side gear shaft 44 via the needle bearings 98. The screw shaft member 142 is formed with a worm wheel 142a that meshes with the worm 100 formed on the motor shaft of the electric motor 74.

As shown in FIG. 8, the case member 70 is formed with inner circumferential spline teeth 70b, and the nut member 144 is formed with outer circumferential spline teeth 144a spline-fitted to the inner circumferential spline teeth 70b. The nut member 144 is screwed on the screw shaft member 142 via a plurality of balls 152. Namely, with the inner circumferential spline teeth 70b of the case member 70 thus provided, the nut member 144 is supported by the side gear shaft 44 such that it can move in the direction of the first axis C1 of the side gear shaft 44, and cannot rotate about the first axis C1. With this arrangement, when the screw shaft member 142 is rotated/driven by the electric motor 74, the nut member 144 moves in the direction of the first axis C1 of the side gear shaft 44, and linear motion of the nut member 144 is transmitted to the friction clutch 72.

As described above, according to the differential limiting device 140 of this embodiment, the nut member 144 is supported by the side gear shaft 44 such that it cannot rotate about the first axis C1 of the side gear shaft 44, and the screw shaft member 142 is supported by the side gear shaft 44 such that it cannot move in the direction of the first axis C1 of the side gear shaft 44, and can rotate about the first axis C1 of the side gear shaft 44. Therefore, when the screw shaft member 142 is rotated/driven by the electric motor 74, the nut member 144 moves in the direction of the first axis C1 of the side gear shaft 44, and the linear motion of the nut member 144 is transmitted to the friction clutch 72.

While some embodiments of the disclosure have been described in detail based on the drawings, the disclosure may also be embodied in other forms.

While the differential limiting device 66, 110, 120, 140 is included in the rear-wheel differential device 30 in the above embodiments, it may be included in the front-wheel differential device 28. Also, while the rear-wheel differential device 30 including the differential limiting device 66, 110, 120, 140 is provided in the four-wheel drive vehicle with a disconnecting function, it may be provided in a four-wheel drive vehicle having no disconnecting function, or may also be provided in a two-wheel drive vehicle, for example.

While the ball screw is illustrated as an example of the screw mechanism 76, 146 in the above embodiments, the disclosure is not limited to this arrangement. The screw mechanism 76, 146 is only required to serve as a conversion mechanism that converts rotary motion of the electric motor 74 into linear motion, and may be a simple combination of the screw shaft member 92, 142 and the nut member 90, 144 which are directly screwed on each other, for example. More specifically, the screw mechanism 76, 146 may be a sliding screw. In the case where the sliding screw is employed, the mechanical efficiency with which rotary motion is converted into linear motion is reduced as compared with that of the ball screw, but a certain advantageous effect that larger thrust force can be applied to the friction clutch 72 may be yielded.

While the screw mechanism 76 is indirectly coupled to the electric motor 74 via the worm gear 88 in the above embodiments, the disclosure is not limited to this arrangement. For example, the nut member 90 of the screw mechanism 76 and the electric motor 74 may be directly coupled to each other without using the worm gear 88. More specifically, the nut member 90 and the electric motor 74 may be directly coupled to each other, such that a pinion provided on the motor shaft of the electric motor 74 meshes with gear teeth formed on the nut member 90.

While the nut member 90 of the screw mechanism 76 is rotated/driven by the electric motor 74 in the above embodiments, the nut member 90 may be rotated/driven by an actuator, such as a hydraulic motor of a type having a mechanism similar to that of a vane pump, or an actuator of a type in which a rack of a rack and pinion is driven by a hydraulic or pneumatic cylinder.

It is to be understood that the embodiments as described above are mere examples, and that the disclosure may be embodied with various changes or improvements, based on the knowledge of those skilled in the art.

What is claimed is:

1. A differential limiting device for a vehicle,
    the differential limiting device configured to limit differential rotation of a pair of side gears provided in a differential device,
    the differential limiting device comprising:
        a clutch hub coupled to one of a differential case of the differential limiting device and a side gear shaft;
        a clutch drum coupled to the other of the differential case and the side gear shaft;
        a friction clutch including a plurality of frictional engagement elements and a piston;
        an actuator; and
        a screw mechanism including a screw shaft member and a nut member that are screwed together,
    wherein the side gear shaft is coupled to the side gear,
        the plurality of frictional engagement elements include first frictional engagement elements and second frictional engagement elements,
        the first frictional engagement elements are configured to be relatively non-rotatably engaged with the clutch drum,
        the second frictional engagement elements are configured to be relatively non-rotatably engaged with the clutch hub,
        the first frictional engagement elements and the second frictional engagement elements are configured to overlap with each other so as to be in friction contact with each other,
        the screw mechanism is configured to convert rotary motion of the actuator into linear motion of the nut member in an axial direction of the side gear shaft when a screw member is rotated about an axis of the side gear shaft by the actuator,
        the screw member is one of the screw shaft member and the nut member,
        the piston is configured to depress the plurality of frictional engagement elements, the piston is configured to rotate relative to the nut member about the axis of the side gear shaft,
        the piston is configured to be unable to move relative to the nut member in the axial direction of the side gear shaft,
        the piston is configured to be unable to rotate relative to a first clutch component about the axis of the side gear shaft,
        the piston is configured to move relative to the first clutch component in the axial direction,
        the piston is configured to be relatively non-rotatably engaged with a second clutch component when the piston is moved in a direction opposite to a direction in which the piston depresses the frictional engagement elements, and
        the first clutch component is one of the clutch hub and the clutch drum, and the second clutch component is the other of the clutch hub and the clutch drum.

2. The differential limiting device according to claim 1, wherein
    the piston is spline-fitted to the first clutch component such that the piston cannot rotate relative to the first clutch component, and is configured to move relative to the first clutch component in the axial direction of the side gear shaft,
    the piston includes first meshing teeth, and the second clutch component includes second meshing teeth, and
    the first meshing teeth mesh with the second meshing teeth when the piston is moved by the nut member in the direction opposite to the direction in which the piston depresses the frictional engagement elements.

3. The differential limiting device according to claim 1, wherein
    the screw member is the nut member, the nut member is supported by the side gear shaft such that the nut member rotates about the axis of the side gear shaft, and the screw shaft member is supported by the side gear shaft such that the screw shaft member cannot move in the axial direction of the side gear shaft, and cannot rotate about the axis of the side gear shaft.

4. The differential limiting device according to claim 1, wherein
    the screw member is the screw shaft member, the nut member is supported by the side gear shaft such that the nut member cannot rotate about the axis of the side gear shaft, and the screw shaft member is supported by the side gear shaft such that the screw shaft member cannot move in the axial direction of the side gear shaft and rotates about the axis of the side gear shaft.

5. The differential limiting device according to claim 1, wherein
    the actuator is coupled to the screw mechanism via a worm gear.

6. The differential limiting device according to claim 1, wherein
    the nut member and the screw shaft member are screwed together via a plurality of balls.

* * * * *